US009780646B2

(12) United States Patent
Youssef (10) Patent No.: US 9,780,646 B2
(45) Date of Patent: Oct. 3, 2017

(54) SWITCH MODE POWER CONVERTER FOR THREE PHASE POWER

(71) Applicant: Marotta Controls, Inc., Montville, NJ (US)

(72) Inventor: Joseph Fayez Youssef, Bridgewater, NJ (US)

(73) Assignee: Marotta Controls, Inc., Montville, NJ (US)

( * ) Notice: Subject to any disclaimer, the term of this patent is extended or adjusted under 35 U.S.C. 154(b) by 0 days.

(21) Appl. No.: 14/666,841

(22) Filed: Mar. 24, 2015

(65) Prior Publication Data

US 2016/0285384 A1 Sep. 29, 2016

(51) Int. Cl.
| | |
|---|---|
| *H02M 3/158* | (2006.01) |
| *H02M 3/335* | (2006.01) |
| *H02M 7/217* | (2006.01) |
| *H02M 7/08* | (2006.01) |
| *H02M 7/64* | (2006.01) |
| *H02M 1/42* | (2007.01) |

(52) U.S. Cl.
CPC ........ *H02M 1/4216* (2013.01); *H02M 1/4258* (2013.01); *Y02B 70/126* (2013.01)

(58) Field of Classification Search
CPC ....... H02M 2001/007; H02M 2001/08; H02M 2001/064; H02M 2001/217; H02M 2001/2176; H02M 3/1584; H02M 3/33507; H02M 3/33569; H02M 2003/1586; H02M 7/217; H02M 7/2176; H02M 7/08; H02M 7/064
USPC ............................... 363/69, 70, 89, 125, 126
See application file for complete search history.

(56) References Cited

U.S. PATENT DOCUMENTS

| | | | | |
|---|---|---|---|---|
| 6,278,624 | B1 * | 8/2001 | Nelson | H02J 1/108 363/21.15 |
| 6,690,588 | B2 * | 2/2004 | York | H02M 5/271 363/124 |
| 8,309,878 | B2 * | 11/2012 | Winn | B23K 9/1075 219/121.11 |
| 9,531,282 | B1 * | 12/2016 | Nikitin | H02M 1/4216 |
| 2011/0007527 | A1 * | 1/2011 | Liu | H02M 3/33561 363/21.02 |
| 2011/0133704 | A1 * | 6/2011 | Zambetti | H02M 3/1584 323/212 |
| 2011/0235379 | A1 * | 9/2011 | Siri | H02M 7/08 363/125 |
| 2012/0212984 | A1 * | 8/2012 | Yamada | H02M 7/219 363/89 |

(Continued)

*Primary Examiner* — Timothy J Dole
*Assistant Examiner* — Sisay G Tiku
(74) *Attorney, Agent, or Firm* — Lerner, David, Littenberg, Krumholz & Mentlik, LLP (57) ABSTRACT

A device and system for converting a three phase power input to a direct current output, and method of operating the device and system, are provided. The device includes a rectifier circuit for rectifying the three phase power input into a plurality of rectified outputs, a converter circuit for converting each of the rectified outputs, and a control circuit for generating the control signal based at least in part on the single direct current output. Each of the rectified outputs may have a common first mean voltage level, which is converted to a second mean voltage level based on a control signal. Each of the rectified outputs at the second mean voltage level are capable of being combined into a single direct current output.

34 Claims, 8 Drawing Sheets

(56) References Cited

U.S. PATENT DOCUMENTS

| | | | |
|---|---|---|---|
| 2013/0020989 A1* | 1/2013 | Xia | H02M 7/2176 320/109 |
| 2013/0201733 A1* | 8/2013 | Divan | H02M 1/00 363/39 |
| 2014/0028211 A1* | 1/2014 | Imam | H02M 3/33507 315/200 R |
| 2014/0111016 A1* | 4/2014 | He | H02M 3/285 307/82 |
| 2016/0033978 A1* | 2/2016 | Giuntini | H02M 3/1584 307/31 |

* cited by examiner

SWITCH MODE POWER CONVERTER FOR THREE PHASE POWER

FIELD OF THE INVENTION

The present invention relates to devices, systems and methods for converting three phase power to direct current power.

BACKGROUND OF THE INVENTION

Devices for converting a three phase power input to an adjustable direct current output generally include a rectifier stage for converting the three phase alternating current (AC) input into a direct current (DC) output, and a DC-DC conversion stage for adjusting the direct current output. The DC-DC conversion stage may be capable of raising or lowering the DC voltage level, or both, depending on the particular features of a given device.

In many applications, and particularly high power applications, it is desirable that power conversion circuitry provide power factor correction to ensure high power efficiency and to minimize the input current. Power factor correction prevents harmonic currents from distorting the supplied power waveform, thereby keeping both input voltage and current waveforms in phase and maintaining the apparent power of the three phase power input. Power efficiency becomes increasingly important for high power applications, since more power that is demanded at a given percentage of efficiency, the more power is lost in the conversion process. Lost or dissipated power is not only wasteful, but can also introduce unwanted heat to the power conversion circuitry. Cooling equipment could then be required to cool the circuitry, which may in turn add cost, increase weight and take up valuable space. The weight and space of the power conversion circuitry may be especially important in aircraft or spacecraft applications, in which conservation of weight and/or space can in turn improve the flight of and reduce the fuel requirements of an aircraft or spacecraft on which the circuitry is installed.

It is yet further desirable that the power conversion circuitry poses a low technical risk, thereby reducing the risk of failure, and also reducing the cost of designing, manufacturing and maintaining the circuitry.

It is also desirable that the circuitry be operable in applications for which high frequency power is supplied, such as the 115V 400 Hz AC power commonly used for aircraft.

Figure 1:
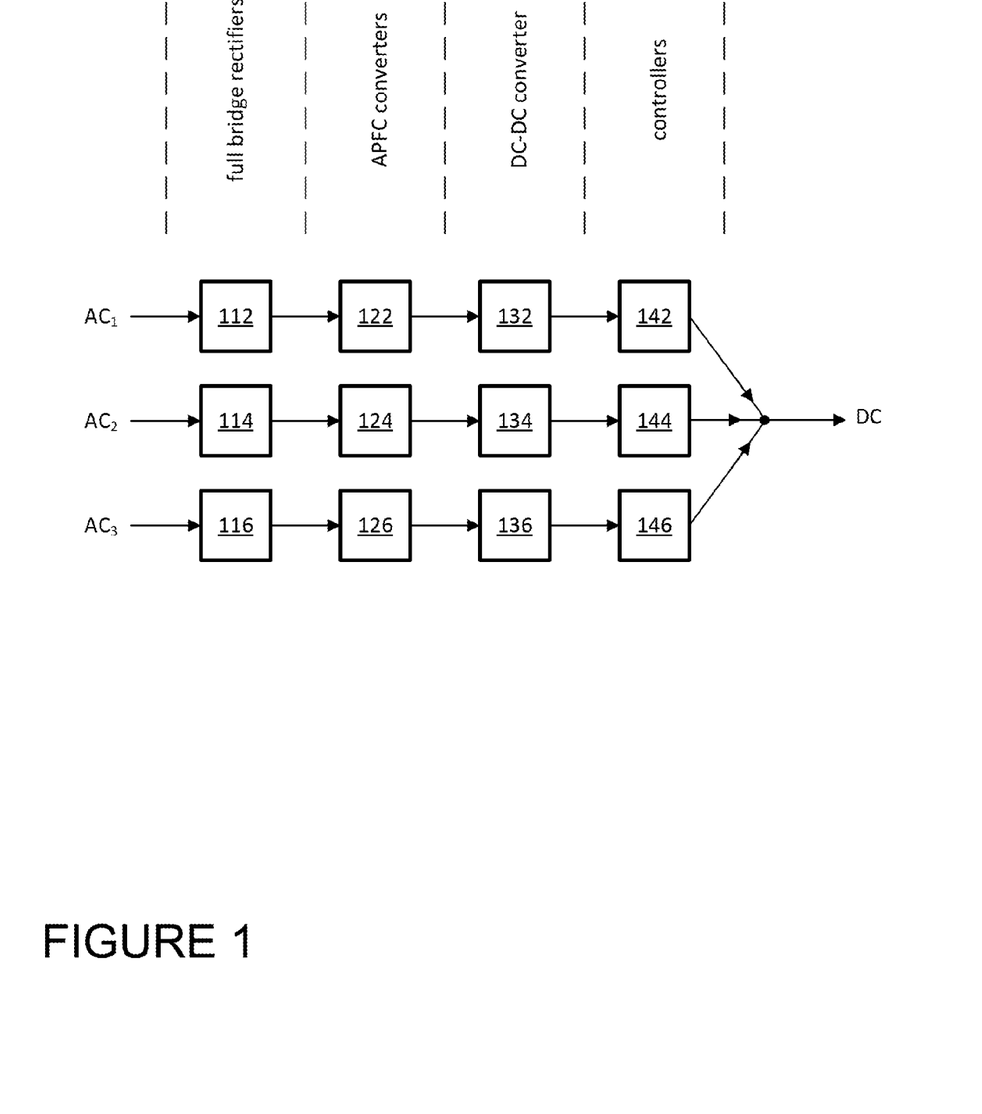
FIG. 1 is a functional block diagram of a prior art device for converting three phase power.

FIG. 1 is a functional block diagram representation of one power conversion device known in the art for converting a three-phase AC input to a DC output while achieving power factor correction with a power efficiency of about 90%. The device of FIG. 1 includes three separate full bridge rectifiers 112-116, each rectifier taking in a different phase input $AC_1$, $AC_2$ and $AC_3$ of the three phase AC source. The rectified output of each rectifier 112-116 is then fed to a respective active power factor correction (APFC) converter 122-126, which provides power factor correction for the rectified current and voltage. Each APFC converter 122-126 is connected to a respective DC-DC converter 132-136, which receives the output of the converter, adjusts the voltage level of the output, and electrically isolates (i.e., floats) the adjusted voltage from the converter. Load sharing of the respective floated outputs of the DC-DC converters are managed by controllers 142-146, and combined into a single DC output. Thus, the device of FIG. 1 achieves power factor correction, electrical isolation, and power regulation (with a second conversion).

However, the device of FIG. 1 requires nine independent control circuits (one for each APFC, one for each DC-DC converter, and one for each load sharing controller) to operate. This adds unwanted cost, weight and space to the design. The device also requires a lot of bus capacitance, and requires not one but two stages of DC-DC conversion to yield the converted power. Moreover, the control circuitry is complex and, therefore, poses a high cost and a high technical risk.

Figure 2:
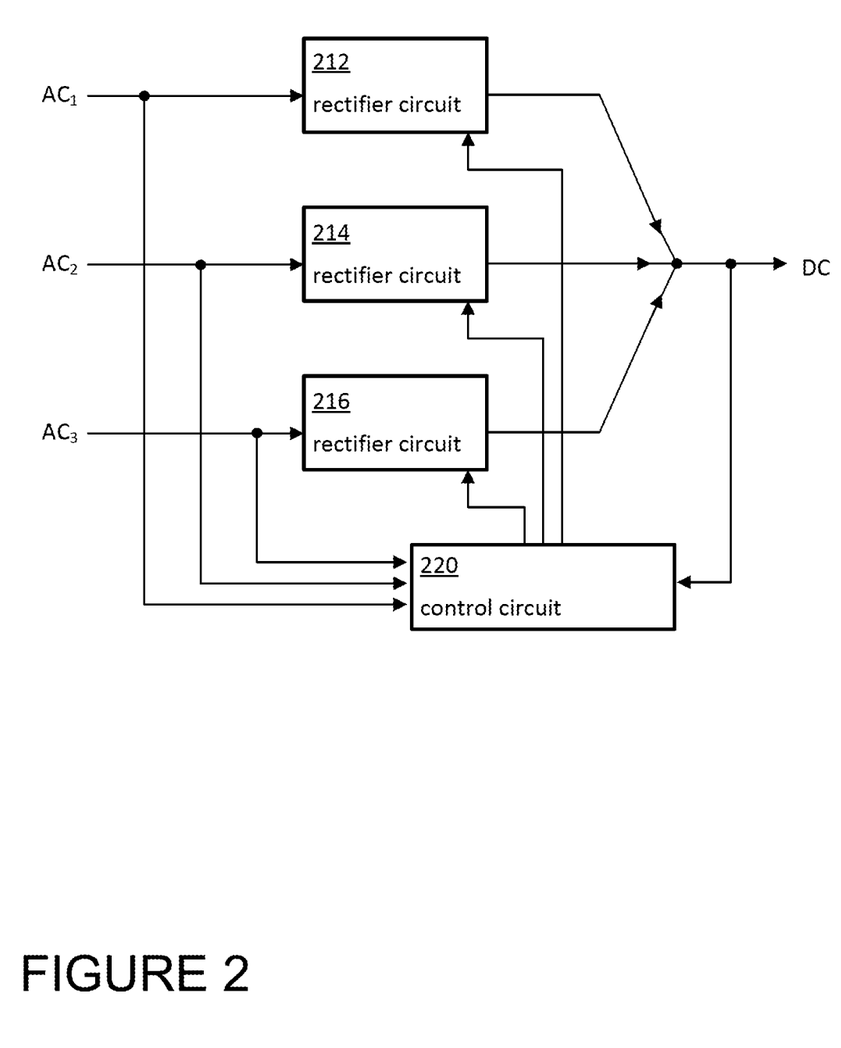
FIG. 2 is a functional block diagram of another prior art device for converting three phase power.

FIG. 2 is a functional block diagram representation of a Vienna rectifier, another power conversion device known in the art for converting a three-phase AC input to a DC output while achieving power factor correction with an improved power efficiency (relative to the device of FIG. 1. The device of FIG. 2 includes three switch controlled rectifier circuits 212-216 and a control circuit 220. The control circuit receives as inputs the input three phase AC power and the output DC power. Based on a complex calculation, the control circuit 220 uses these inputs to determine a separate control instruction for each switch of the respective rectifier circuits 212-216. The rectified outputs of the rectifier circuits 212-216 are combined to yield the DC output of the device. Thus, the device of FIG. 2 achieves power factor correction and power regulation (although the output voltage may only be stepped up and not down) with a single control circuit and three switches.

However, the device of FIG. 2 does not achieve electrical isolation, and still requires a complex control circuit, which adds unwanted cost, technical risk, and some weight and space to the design.

Accordingly, there is a need for a smaller, lighter, less expensive, and less complex power conversion circuit that achieves power factor correction, power regulation and electrical isolation, preferably with at least the same or better power efficiency.

BRIEF SUMMARY OF THE INVENTION

One aspect of the disclosure provides for a device for converting a three phase power input to a direct current output. The device may include a rectifier circuit for rectifying the three phase power input into a plurality of rectified outputs having a common first mean voltage (or current, or power) level, a converter circuit for converting each of the rectified outputs from the first mean voltage level to a second mean voltage (or current or power) level based on a control signal, and a control circuit for generating the control signal based at least in part on a single direct current output that includes each of the rectified outputs at the second mean voltage level. Each of the rectifier outputs may provide a continuously positive electrical current.

In some examples, the rectifier circuit may include each of a first bridge rectifier circuit adapted to rectify first and second phase inputs of the three phase power input, a second bridge rectifier circuit adapted to rectify second and third phase inputs, and a third bridge rectifier circuit adapted to rectify first and third phase inputs. Also, the converter circuit may include first, second and third isolation power conversion circuits, each adapted to electrically isolate an output of the first, second and third bridge rectifier circuits, respectively. Each of the first, second and third isolation power conversion circuits may further be adapted to transfer an amount of electrical current from the output of the respective bridge rectifier circuit based on the control signal. The single direct current output may be produced from the combination of isolated outputs. In some examples, the control circuit may include a pulse width modulator, and the single direct current output may be controlled by a pulse width of the control signal.

In some examples, the device may further include a load capacitor connected in parallel to each of the rectified outputs. The load capacitor may be adapted to combine the rectified outputs into the single direct current output. The single direct current output may be regulated by the control circuit without the control circuit performing load sharing techniques or receiving a current measurement.

In some example devices for which the single direct current output is about 3 kilowatts, 10 kilowatts, or greater, the power factor of the device may be about 95% percent or greater. In some example devices, the total current harmonic distortion to the three phase power input may be less than about 4%, and/or the direct current output may have a near unity power factor.

The device may include a housing, such that each of the rectifier circuit, converter circuit and control circuit is disposed fully within the housing. Such a device may weigh less than about 6.75 pounds (e.g., between about 3.5 and about 6.75 pounds), and may have a power density of greater than about 444 W/lb (e.g., 930 W/lb).

Another aspect of the disclosure provides for a system including any of the above example devices, a three phase power source coupled to such example device and another device (e.g., a high pressure compression system) coupled thereto, such that operation of the other device is powered by the single direct current output. Such a system may be included in a vehicle, aircraft, spacecraft, or watercraft.

A further aspect of the disclosure provides for a device for converting a three phase power input to a direct current output. The device may include a control circuit adapted to generate a control signal based on only one power conversion parameter, and a plurality of power conversion sub-circuits adapted to receive at an input connection a portion of the three phase power input, and to convert the received portion to a converted power output based on the control signal. A respective output connection of each sub-circuit may be coupled in parallel to one another such that the respective converted power outputs of each of the sub-circuits are combined into the direct current output. The direct current output may further be coupled to the control circuit, such that the power conversion parameter corresponds to the direct current output. Each of the power conversion sub-circuits may supply an equal portion of power to the direct current output.

In one example, each of the power conversion sub-circuits may include a bridge rectifier circuit, each bridge rectifier circuit including a two-phase full-bridge rectifier receiving two of the three phases of the power input, the two phases having a phase difference of about 120°. Each of the power conversion sub-circuits may also include a transformer for transferring an amount of power from the input to the output, and a switching circuit for controlling operation of the transformer based on the control signal. The control signal may control a duty cycle of the switching circuit, which in turn may control an amount of power transferred by the transformer based on the duty cycle. In another example, the device may include a filter circuit coupled to the plurality of power conversion sub-circuits for filtering a switching frequency of the device.

Yet another aspect of the disclosure provides for a switch mode power converter including a voltage rectification circuit adapted to receive a three phase power input, and a flyback transformer circuit coupled to the voltage rectification circuit and adapted to receive a first voltage from the voltage rectification circuit and convert the first voltage to a second voltage based on a switch duty ratio. In the switch mode power converter, an electrical current across a primary coil of the flyback transformer circuit may vary linearly relative to the first voltage of the voltage rectification circuit. The switch mode power converter may include at least three flyback transformer circuits, with each flyback transformer circuit's switch being controlled by an identical control signal.

In one example, the primary inductor coil may be electrically coupled to the voltage rectification circuit and may be adapted to store an amount of electrical energy. The flyback transformer circuit may further include a secondary inductor coil operatively coupled to the primary inductive coil and adapted to transfer the stored electrical energy, thereby generating an electrical current at the secondary inductor coil, as well as a flyback diode electrically coupled to the secondary conductor coil to control the transfer of the electrical current. The flyback transformer circuit may also include an output capacitor electrically coupled to the secondary conductor coil to filter the generated electrical current. The flyback transformer circuit may yet further include a switch electrically coupled to the primary inductor coil and operative to control the amount of energy stored by the primary inductor based on the switch duty ratio. The switch and primary inductor coil may operate in a steady state condition such that the switch duty ratio of the switch and inductance of the primary inductor coil are constant.

Yet a further aspect of the disclosure provides for a power converter for converting a three phase alternating current power input into a direct current power output in a single conversion stage. The power converter may include means for rectifying the three phase alternating current power input, means for regulating the voltage or current level of the direct current power output based on the direct current power output, and means for electrically isolating the alternating current power input from the direct current power output. The means for regulating may itself include means for generating a control signal based on the direct current power output, and means for converting the rectified three phase alternating current power input from a first power level to a second power level based on the control signal.

One further aspect of the disclosure provides for a method of converting a three phase power input to a direct current output, including: rectifying the three phase power input into a plurality of rectified outputs, each of the rectified outputs having a common first mean power level; converting each of the plurality of rectified outputs from the first mean power level to a second mean power level based on a control signal; combining the converted rectified outputs into a single direct current output; and generating the control signal based on the single direct current output. In some examples, the method may further involve generating a switching frequency greater than the frequency of the three phase input, and modulating the rectified output using the switching frequency (e.g., filtering harmonics of the switching frequency).

Rectifying the three phase power input may involve combining first and second phase inputs of the three phase power input into a first rectified voltage using a first rectifier sub-circuit, combining second and third phase inputs of the three phase power input into a second rectified voltage using a second rectifier sub-circuit, and combining first and third phase inputs of the three phase power input into a third rectified voltage using a third rectifier sub-circuit. Converting each of the rectified outputs may involve electrically isolating each rectified output using a respective isolation power conversion circuit. Control of the controlling converted output power level may be based on a pulse width of the control signal.

DETAILED DESCRIPTION

Figure 3:
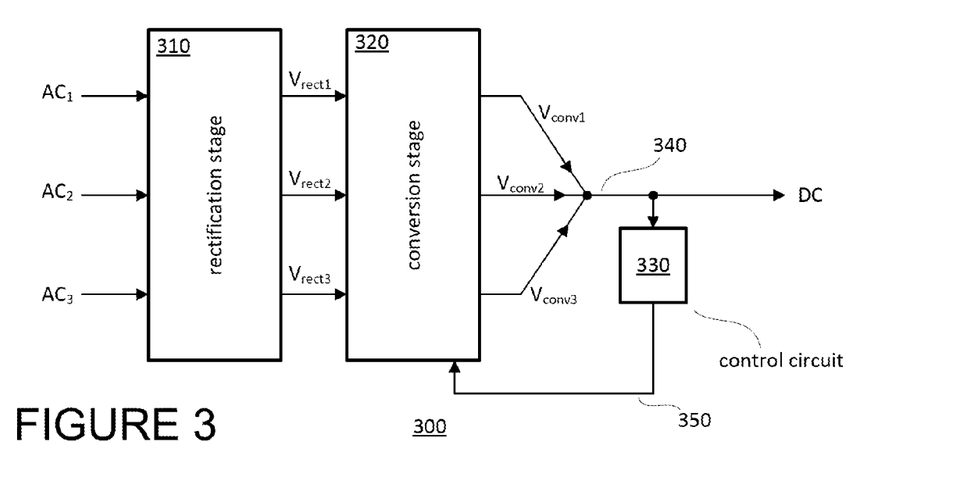
FIG. 3 is a functional block diagram of a device for converting three phase power in accordance with an aspect of the present disclosure.

FIG. 3 is a functional block diagram representation of a device 300 for converting three phase AC power to DC power in accordance with an aspect of the present disclosure. The device 300 includes each of a rectification stage 310, a conversion stage 320, and a control circuit 330. In the example of FIG. 3, the control circuit 330 receives an input, which is the DC output of the device 300, and based on that input provides a control signal 350 to the conversion stage 320. The conversion stage 320 is controlled based on the control signal 350.

Figure 4:
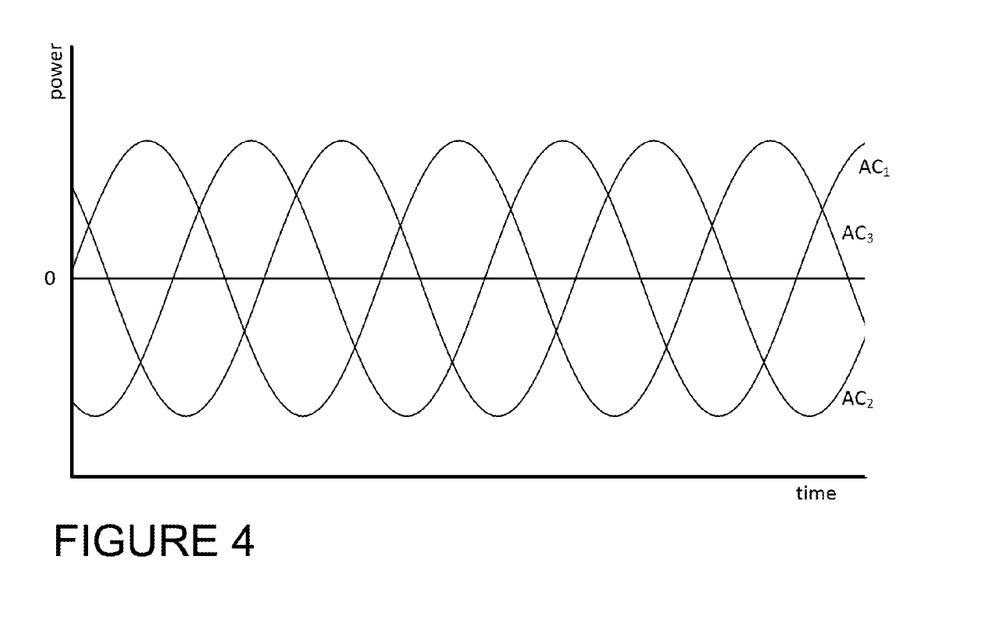
FIG. 4 is a graphical representation of a three phase power input in accordance with an aspect of the present disclosure.

As shown in FIG. 3, the rectification stage 310 receives three inputs, one input for each phase of the three phase AC input. For purposes of clarity, these inputs will be referred to as $AC_1$ (having a phase of 0°), $AC_2$ (having a phase of) +120° and $AC_3$ (having a phase of −120°) respectively. For illustrative purposes, an example of the three inputs $AC_1$, $AC_2$ and $AC_3$ are plotted over time in FIG. 4. In the example of FIG. 4, the inputs $AC_1$, $AC_2$ and $AC_3$ have a common RMS voltage level (or mean voltage level) and have unity power factor.

Using the three inputs, the rectification stage 310 produces three rectified outputs $V_{rect1}$, $V_{rect2}$ and $V_{rect3}$, which are then provided to the conversion stage 320. Using the three rectification stage outputs, the conversion stage 320 produces three converted outputs $V_{conv1}$, $V_{conv2}$ and $V_{conv3}$. Each of the converted outputs may have a raised or lowered voltage level, as compared to the corresponding three rectified outputs $V_{rect1}$, $V_{rect2}$ and $V_{rect3}$, based on operation of the conversion stage 320 (for instance, as described in connection with FIG. 8, below). The converted outputs are then combined into a single DC output 340 by connecting them in parallel to a single node, such as to a common load capacitor (as described in connection with FIG. 8, below). The single DC output 340 provides continuously positive DC power, and is provided as a control parameter to the control circuit 330. Based on sensing this control parameter (e.g., the voltage level of the single DC output 340), the control circuit provides a control signal 350 to the conversion stage 320 such that operation of the conversion stage is controlled based on the control signal. Thus, the conversion stage is at least in part controlled by sensing the combined DC output. In some examples, the combined DC output is the only parameter needed to control the conversion stage.

Figure 5:
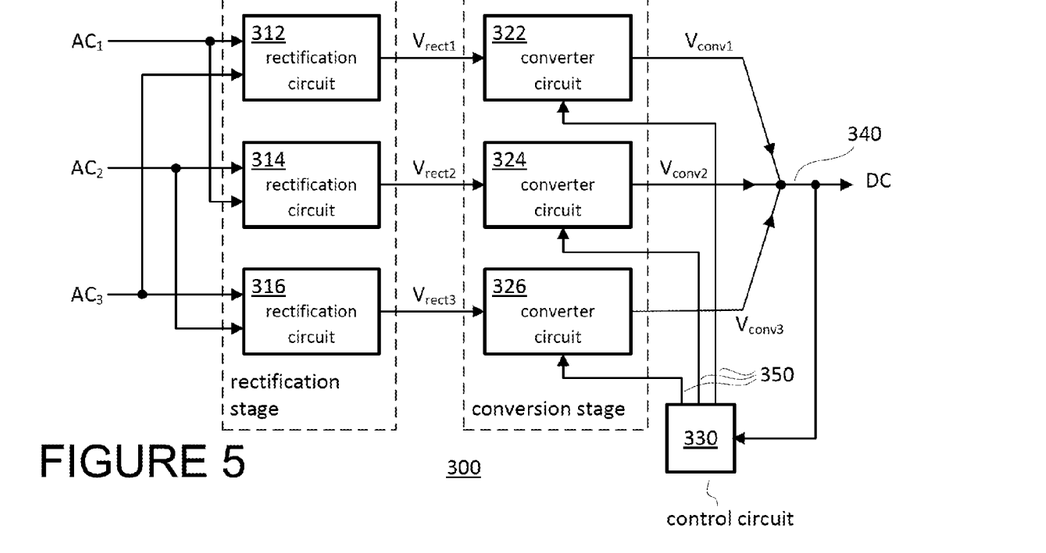
FIG. 5 is an example functional layout of the components of the device of FIG. 3 in accordance with an aspect of the present disclosure.

FIG. 5 provides an example layout of the components of each of the rectification stage 310, conversion stage 320, and control circuit 330 of FIG. 3. In the example of FIG. 5, the rectification stage 310 includes three separate rectification circuits 312, 314 and 316. Each rectification circuit receives two of the three AC inputs (e.g., circuit 312 receives $AC_1$ and $AC_3$, circuit 314 receives $AC_1$ and $AC_2$, and circuit 316 receives $AC_2$ and $AC_3$). Using the two inputs, each rectification circuit produces a single rectified output $V_{rect1}$, $V_{rect2}$ and $V_{rect3}$ respectively) that is passed along to a separate converter circuit (322, 324, 326) in the conversion stage.

The output $V_{rect1}$ of rectification circuit 312 is provided to converter circuit 322, the output $V_{rect2}$ of rectification circuit 314 provided to converter circuit 324, and the output $V_{rect3}$ of rectification circuit 316 provided to converter circuit 326. Each converter circuit then converts the respective rectified output, and the converted outputs are combined into a single DC output 340. Each converter may provide exactly one third of the output power of the single DC output 340.

The combined output 340 is fed to the control circuit 330, which provides feedback control. In the example of FIG. 5, the feedback control is a negative feedback control. Also, in the example of FIG. 5, the same feedback control signal 350 is provided to each of the separate converter circuits 322, 324 and 326.

Figure 6:
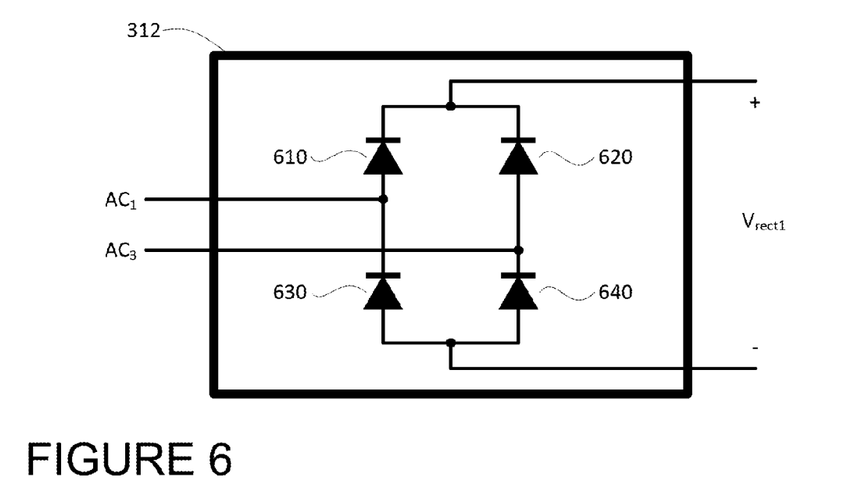
FIG. 6 is a circuit diagram of a rectifier component of a device for converting three phase power, such as the device represented in FIG. 5, in accordance with an aspect of the present disclosure.

FIG. 6 is a circuit diagram of an example embodiment of the rectification circuit 312 of FIG. 5. In the example of FIG. 6, the rectification circuit is configured as a two-phase full bridge rectifier, such that two of the three AC inputs are connected to the respective input ends of the rectifier, and the voltage drop across the respective output ends is the rectified output. The configuration ensures that the two AC inputs are rectified. In the example of FIG. 6, diodes 610 and 640 are forward biased when $AC_1$ is greater than $AC_3$, and diodes 620 and 630 are forward biased when $AC_3$ is greater than $AC_1$. Thus, the voltage drop $V_{rect1}$ across the output terminal will always be 0 volts or greater.

The use of only two different AC inputs having a phase difference of 120 degrees (in this example, $AC_1$ and $AC_3$) in a two-phase full-bridge configuration, as opposed to using all three AC inputs in a three-phase full bridge configuration, eliminates the presence of current discontinuity. In a three-phase full-bridge configuration, only two of the three phases are active (i.e., providing current) and the third phase is inactive. This abrupt switching of the diodes creates discontinuity and highly distorted current draw. The switching also introduces unwanted harmonics to the device 300 that, in turn, result in poor power quality performance. By contrast, use of two AC inputs having a phase difference of 120 degrees in a two-phase full-bridge avoids such discontinuities.

Figure 7:
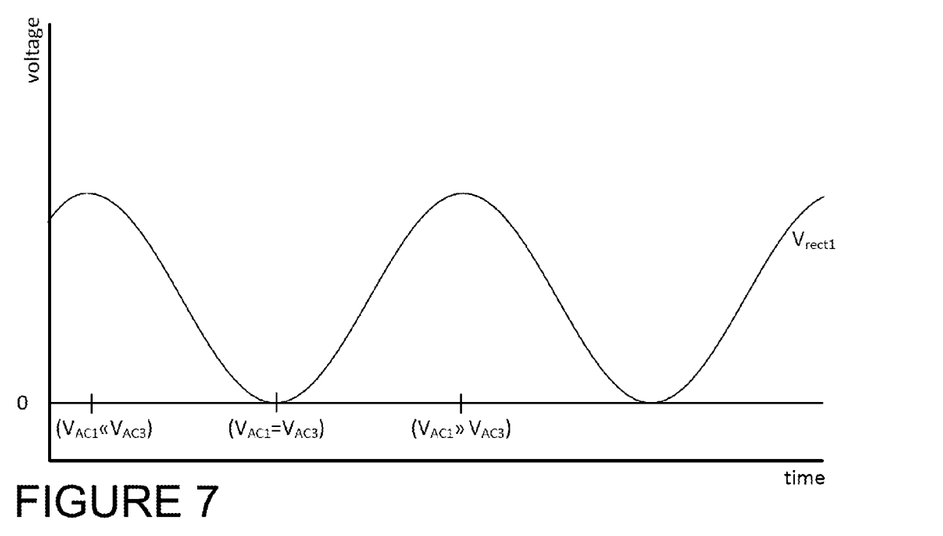
FIG. 7 is a graphical representation of an output of a rectifier component, such as the rectifier component shown in FIG. 5, in accordance with an aspect of the present disclosure.

For example, FIG. 7 illustratively demonstrates the rectification of inputs $V_{AC1}$ and $V_{AC3}$ (which have a phase difference of 120 degrees) using a two-phase full bridge configuration. The output of the two-phase full bridge rectifier $V_{rect1}$ is the absolute value difference between the inputs $|V_{AC1}-V_{AC3}|$. When $V_{AC1}$ is much greater than $V_{AC3}$, or vice versa, the output of the rectifier $V_{rect1}$ reaches its maximum. When $V_{AC1}$ equals $V_{AC3}$, the output of the rectifier $V_{rect1}$ drops to zero, but without the current discontinuity yielded by a three-phase full-bridge configuration. This, in turn, maintains the improved power factor and power quality of the rectifier.

The rectification circuit 312 may be representative of the other rectification circuits 314 and 316, in the sense that each rectification circuit includes the same components in the same configuration. Thus, for three inputs having a similar waveform and common RMS voltage level and frequency (such as $AC_1$, $AC_2$ and $AC_3$ of FIG. 4), the output of each rectification circuit will also have a similar wave form and a common RMS voltage level and frequency.

Figure 8:
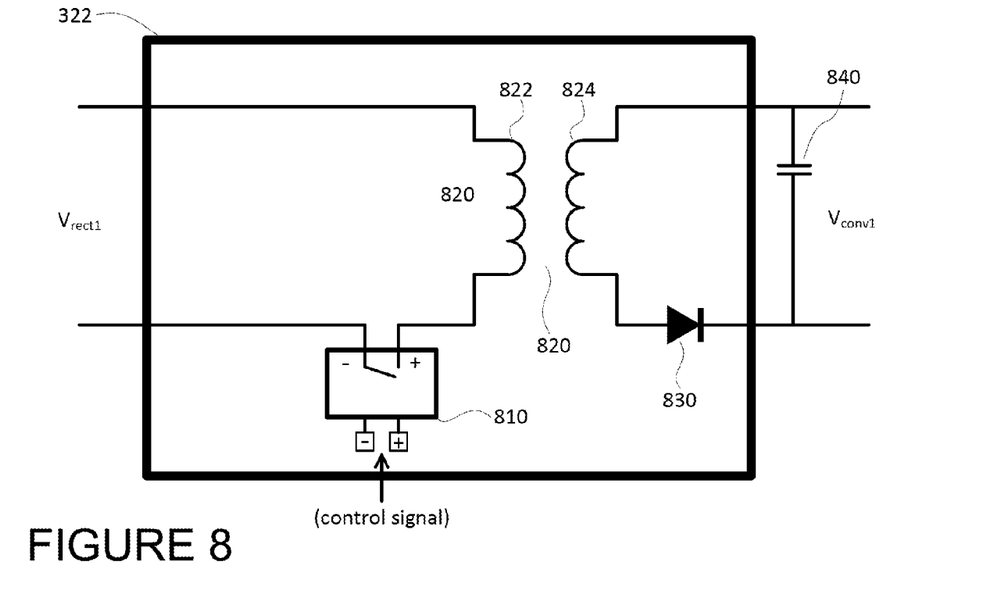
FIG. 8 is a circuit diagram of a converter component of a device for converting three phase power, such as the device represented in FIG. 5, in accordance with an aspect of the present disclosure.

FIG. 8 is a circuit diagram of an example embodiment of the converter circuit 322 of FIG. 5. In the example of FIG. 8, the converter circuit is a switch mode power converter, and includes a transistor 810 as a switch to control operation of a transformer 820 having a primary inductor coil 822 with a first inductance, and a secondary inductor coil 824 with a second inductance which may be the same as or different than the first inductance. When the transistor is ON, the switch is closed and energy builds up across the primary inductor coil 822. When the transistor is OFF, the switch is open and the built up energy across the primary inductor coil 822 is transferred to the secondary inductor coil 824. Diode 830 prevents the primary coil from transferring the current while the switch is closed (i.e., against the direction of the diode 830).

Figure 9:
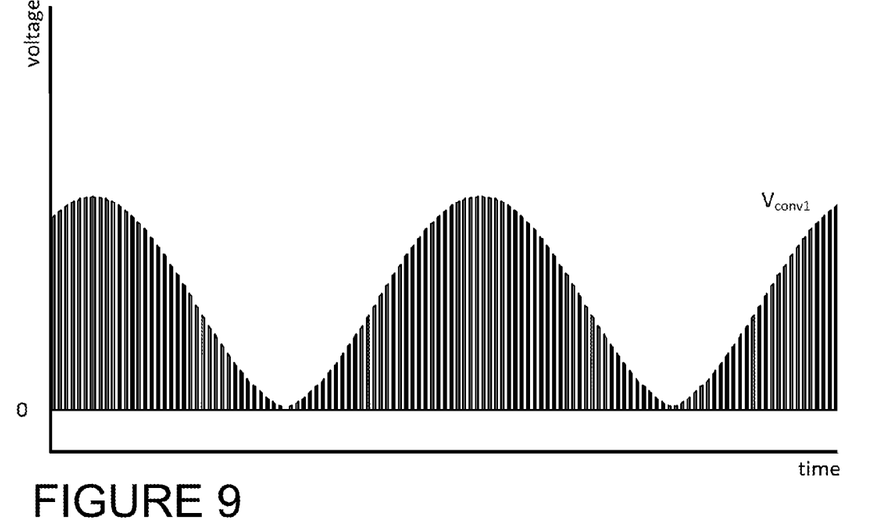
FIG. 9 is a graphical representation of an output of a converter component, such as the converter component shown in FIG. 8, in accordance with an aspect of the present disclosure.

For illustrative purposes, FIG. 9 shows a modulated output across the transformer 820 of the converter circuit 322. The output across the transformer 820 is modulated at the frequency at which the transistor 810 turns ON an OFF. Returning back to FIG. 8, a capacitor 840 may be connected to the output of the converter 322 to filter out the high frequency component of the modulated output.

The amount of energy built up across the primary coil 822, and thereby transferred to the converter circuit output, depends upon the amount of time for which the transistor 810 in ON. The longer the ON time, the more energy builds up. The duration of the ON time of the transistor 810 is controlled by the control signal from the control circuit 330. For example, the control circuit 330 may be a pulse width modulation (PWM) controller providing a modulated output signal having a variable pulse width. In the example of FIGS. 3-8, the PWM controller may be set in a voltage-mode control and provide feedback control to the device 300 by increasing or decreasing the pulse width of the control signal 350 based on the combined output voltage 340 outputted by the conversion stage 320. For instance, a high output voltage may cause the PWM to decrease the pulse width of the control signal. Conversely, a low output voltage may cause the PWM to increase the pulse width of the control signal 350. Thus, the duty cycle of the transistor 810 may be varied based on an output voltage of the device 300 in reference to the desired voltage level.

Alternatively, the desired output voltage of the device 300 may be raised or lowered by adjusting the parameters of the PWM controller 330 that correlate a given voltage of output of the device 300 to a respective pulse width.

To maintain a high power factor, is it desirable that the amount of current at the converter circuits be proportional to the voltage across the corresponding two-phase full bridge rectifier. This in turn requires the power conversion element of the converter circuits look like a linear element (e.g., resistor) to the corresponding rectification circuit. In this respect, the converter circuits 322, 324 and 326 may be designed as voltage-mode flyback circuits, in which the transformer 820 would be preferable for the power conversion element to make the converter circuit 322 appear like a linear element to the corresponding rectifier circuit. This can be seen from the following formula, which dictates the peak primary current in a voltage-mode flyback circuit:

$$I_p = \frac{V}{L} T_{on} \qquad (1)$$

where $I_p$ is the current across the primary inductor coil 822, V is the voltage across the corresponding two-phase full bridge rectifier ($V_{rect}$), L is the inductance of the primary inductor coil 822, and $T_{on}$ is the ON-time of the duty cycle for transistor 810. In steady state conditions, $T_{on}$ and L are both constant. Thus, $I_p$ and V are linearly proportional to one another, meaning that the transformer behaves like a resistor in its response to voltage received from the corresponding rectifier circuit.

The transformer 820 of the converter circuit 322 can have an added benefit in that it is adapted to electrically isolate the power received from the corresponding rectifier circuit. Effectively, the transformer 820 floats the converted power. This allows for the outputs of each converter circuit 322, 324 and 326 to be combined into the single DC output of the device 300 using a single load capacitor (not shown) connected in parallel with the corresponding filter capacitor 840 for each converter circuit, in a straightforward manner without the risk of introducing unwanted harmonics or feedback to the upstream circuitry, such as the rectifier circuit. This, in turn, maintains the improved power factor of the rectifier.

As with the rectification circuits, the converter circuit 322 shown in FIG. 8 may be representative of the other converter circuits 324 or 326 as well, in so far as each includes the same components in the same configuration. Thus, for three rectification circuits producing outputs that have the same waveform, RMS voltage level and frequency, each converter circuit output will also have the same wave form, RMS voltage level and frequency. Furthermore, providing the same components for each of the converters means that the load of each converter is substantially identically resistive. This ensures that the current along the input lines for each the converters are free of harmonics, and achieves a substantially perfect (unity) power factor. The RMS voltage level outputted by the converter circuits may be different from the RMS voltage level outputted by the rectification circuits. This adjustment in RMS power level may depend on the control signal setting of the converter circuits (e.g., the pulse width of the control signal).

The combination of $V_{conv1}$, $V_{conv2}$ and $V_{conv3}$, which is the voltage at the shared single load capacitor, also shown as $V_{out}$. The DC nature of $V_{out}$ is maintained by ensuring that each of $V_{conv1}$, $V_{conv2}$ and $V_{conv3}$ delivers the same amount of power to the shared load (e.g., capacitor 840). The power delivered from each converter is directed by the following formulae:

$$P_{out} = \frac{I_p^2(f * L)}{2} \quad (2)$$

$$I_p = \frac{V}{L}T_{on} \quad (3)$$

in which $P_{out}$ is the power delivered by a given converter, and f is the frequency of the control signal. (L, V and $I_p$ are the same as for formula (1) above.) Given that the inductance and frequency of each converter is the same, and that the output voltage of each corresponding two-phase full bridge rectifier is the same, in order for $P_{out}$ of each converter to be the same, $I_p$ must be the same as well. Since $I_p$ is proportional to the duty cycle of the switch, providing a common duty cycle for each converter ensures that the delivered power is substantially the same. Therefore, a common controller providing a common control signal is used for each converter.

By floating the outputs of each converter circuit 322, 324 and 326, the combined DC output $V_{out}$ can be easily controlled and regulated. In this regard, the converter outputs $V_{conv1}$, $V_{conv2}$ and $V_{conv3}$ can be combined without having to perform complex load sharing operations, and without providing a controller for such load sharing operations. Additionally, the control circuit 330 need only measure $V_{out}$ to properly control each of the converter circuits, without having to receive or otherwise determine a current measurement for the individual converter outputs, or combined output.

Figure 10:
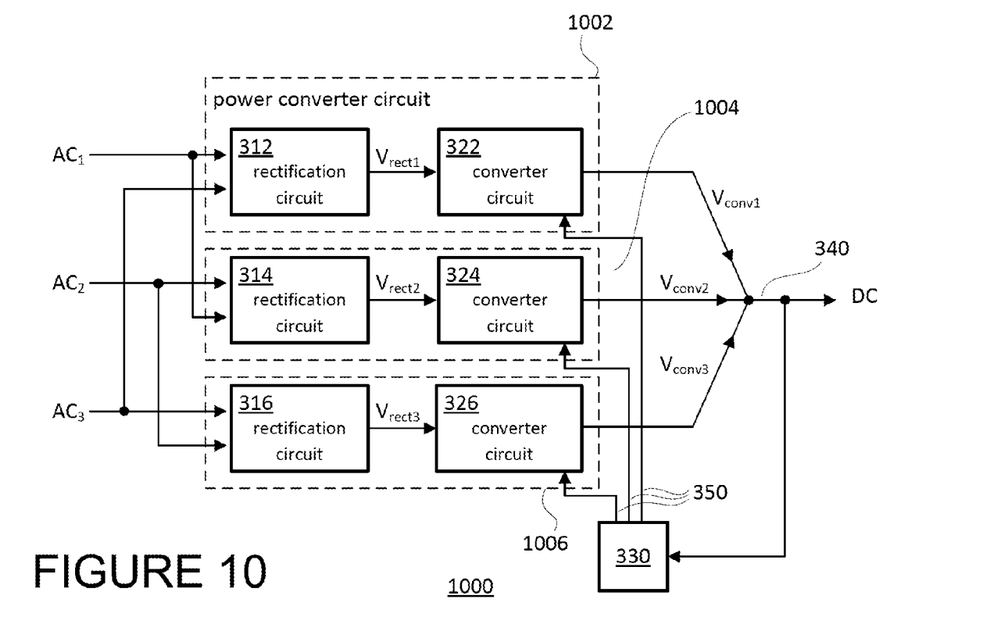
FIG. 10 is another example functional layout of the components of a device for converting three phase power in accordance with an aspect of the present disclosure.

FIG. 10 is a functional block diagram providing an alternative characterization 1000 of the device 300 of FIG. 3. Instead of characterizing the device as having a rectification stage followed by a conversion stage, FIG. 10 shows the device 300 as having three independent power factor correction circuits 1002, 1004 and 1006. Each power factor correction circuit receives a unique two of the three AC power inputs, as well as the common control signal from control circuit 330. There is no communication between the independent power factor correction circuits, and the output of each circuit is electrically isolated from the other outputs by a respective transformer (as discussed above in connection with FIG. 8).

Figure 11:
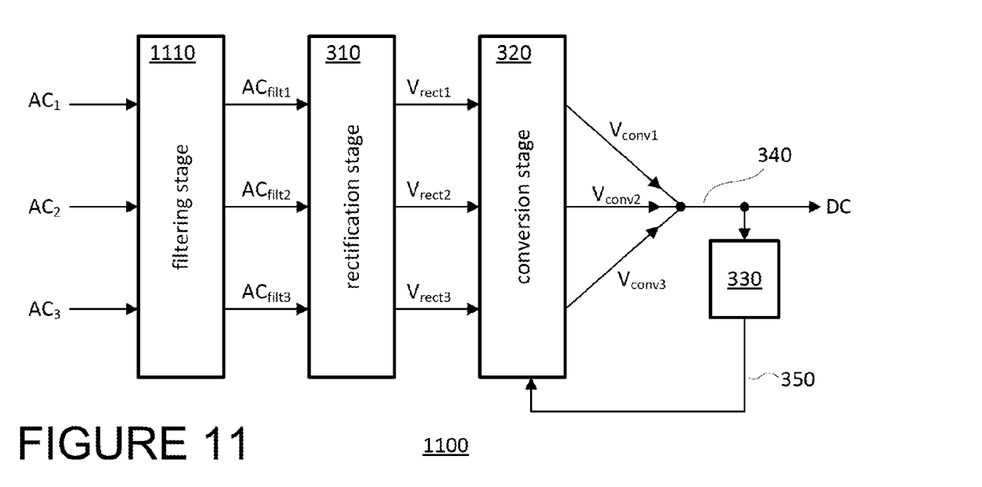
FIG. 11 is a functional block diagram of another device for converting three phase power in accordance with another aspect of the present disclosure.

FIG. 11 is a functional block diagram representation of a device 1100 for converting three phase AC power to DC power in accordance with another aspect of the present disclosure. The device 1100 includes each of the components featured in the device of FIG. 3. Additionally, the device 1100 of FIG. 11 includes a filtering stage 1110 to filter each of the AC power inputs provided to the rectification stage 310.

Figure 12:
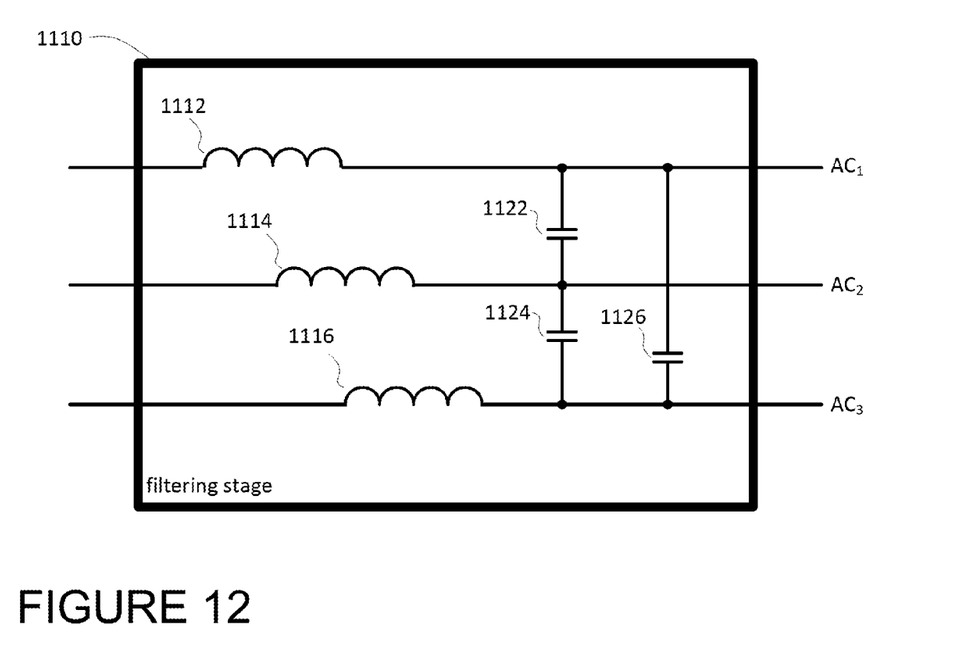
FIG. 12 is a circuit diagram of a filter component of a device for converting three phase power, such as the device represented in FIG. 11, in accordance with an aspect of the present disclosure.

FIG. 12 is a circuit diagram of the filtering stage 1110. As shown in FIG. 12, each of the AC power inputs is electrically serially connected to a corresponding inductor 1112, 1114 and 1116. Additionally, a capacitor 1122, 1124 and 1126 is provided between each pair of AC power inputs. The inductor/capacitor pairs filter out high frequencies (e.g., a switching frequency of the device, unwanted harmonics) from the three phase AC input, with the LC value of each inductor/capacitor pair dictating the cutoff frequency. Each inductor may have the same inductance, and each capacitor may have the same capacitance to ensure that each waveforms of the three phase AC input is the same (but for each waveform having a phase 120 degrees apart from the other two waveforms).

The above example devices 300 and 1100 provide a relatively simple, lightweight, compact, and inexpensive way to perform three phase power factor correction ("PFC") and AC to DC conversion for high voltage applications. High voltage applications may include applications requiring at least 1 kilowatt, at least 2 kilowatts, at least 3 kilowatts, at least 5 kilowatts, or at least 10 kilowatts, depending on the particular equipment that the PFC device is designed to operate. Additionally, because the example devices 330 and 1100 provide rectification and power factor correction in a single conversion stage, the device achieves a high power efficiency of generally about 95%, 96%, or greater. High power efficiency is desirable not only in reducing power wasted by the device, but also in reducing the need (and associated cost) for components to cool and/or dissipate heat generated by wasted power.

Notably, the example devices not only provide near-unity power factor correction (about 99% power factor correction or greater) in a single conversion stage, but also provide rectification of the three-phase AC input, regulation of the DC output, and isolation of the DC output from the AC input. The total distortion due to harmonic currents may be about 4% or even less.

The above example devices 300 and 1100 may be disposed fully within a housing. The housing may include ports or holes for electrically connecting the three phase inputs to the rectification circuitry, or for electrically connecting the combined DC output to other equipment. As mentioned above, the device 300 or 1100 is relatively simple and lightweight. In this regard, taking a 3 kW application for example, the components of the device 300 or 1100 disposed within the housing may be lighter than about 6.75 pounds, which is the weight of a standard auto transformer rectifier unit (ATRU) with similar power capability. In some examples, the weight of the components may be as little as about 3.5 pounds. In a similar respect, the power density of the device may be greater than 444 watts per pound, which is the power density of the aforementioned ATRU. In some examples, the device may achieve a power density of up to about 930 watts per pound. In applications with wattage requirements other than the 3 kW application above, the device 300 or 1100 may be even lighter (or heavier) depending on the required wattage. However, the power density of the device remains approximately the same for applications with different wattage requirements, as the weight of the device varies approximately linearly with the wattage rating supported by the device.

The present disclosure also provides for a system having a power factor correction device such as one of devices 300 and 1100. In such a system, the device is electrically coupled to a three-phase AC power source to converter the three-phase AC power from the source into a single DC output. In the system, the device may also be electrically coupled to another piece of equipment to which it provides the single DC output, and thereby controls or operates the other piece of equipment. The other piece of equipment may be any equipment for which DC power is required, and for which the required DC power is converted and isolated from a three phase AC power generator (as is commonly done in aircraft, spacecraft, watercraft, submarines, wind generators, etc.). One example of such equipment is a high pressure compression system.

The system may be installed in a structure, such as a building, or alternatively on a vehicle, such as any of an automobile, water craft, aircraft, or spacecraft. The particular AC power source of the system may vary depending on the type of structure or vehicle into which the system is installed. For instance, aircraft (and some spacecraft) commonly use 115V 400 Hz AC power, in accordance with the MIL-STD-704 military standard.

In the case of a vehicle, the amount of weight carried by the vehicle can affect fuel consumption. Similarly, the space taken up by the electrical components of the vehicle may require more materials to house those components, which in turn can increase the weight of the vehicle. Thus, reducing the weight and size of the device is generally beneficial when the device is installed in any vehicle. Reduced space and weight of the present disclosure's device is especially beneficial with respect to installation in aircraft and spacecraft, since the amount of weight carried by an aircraft or spacecraft exponentially impacts the amount of fuel required to lift the craft.

High power efficiency is also particularly beneficial in aircraft and spacecraft. Any unwanted heat from wasted power must be cooled or dissipated to prevent damage to the aircraft or spacecraft, and components for cooling and/or dissipating the unwanted heat add further undue weight and space (not to mention expense) to the system. Thus, the high power efficiency of the example devices 300 and 1100 is an important aspect to ensuring the improved simplicity, size and weight of those devices.

Figure 13:
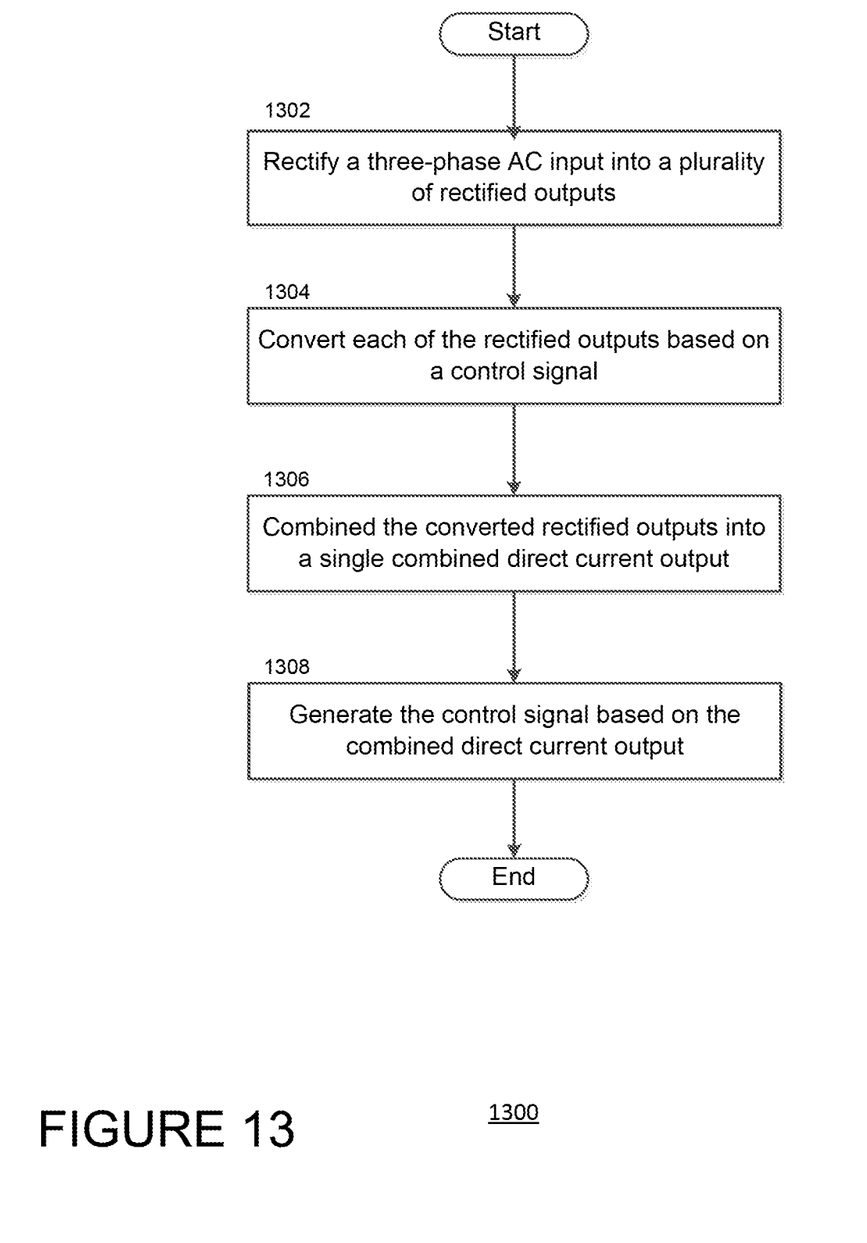
FIG. 13 is a flow diagram of a method for converting a three phase power input to a direct current output in accordance with an aspect of the present disclosure.

The example devices and systems described above may be operated using the method 1300 of FIG. 13 described herein. It should be understood that the steps of the following method do not have to be performed in the precise order described below. Rather, various steps can be handled in a different order, or simultaneously. Moreover, steps may be added or omitted.

At step 1302, the device rectifies a three phase AC power input into a plurality of rectified outputs. As explained above, step 1302 may involve combining first and second phases of the AC power input into a first rectified output, combining second and third phases of the AC power input into a second rectified output, and combining the first and third phases of the AC power input into a third rectified output. Such combining may be accomplished using three two-phase full bridge rectifiers, such that the output of each rectifier is the absolute difference in voltage between the two input phases. Provided that each phase input has a common voltage level, each of the rectified outputs may also have a common voltage level.

At step 1304, the device converts each of the rectified outputs based on a control signal. The conversion may be controlled by a feature of the control signal, such as the pulse width of the control signal. As explained above, step 1404 may involve separately converting each of the first, second and third rectified outputs of step 1302 using separate converters. Provided that each rectified output has a common voltage level, each of the converters may raise or lower the rectified output to a common converted voltage level.

Where the conversion step 1304 relies on transferring power across a transformer based on the state of a switch (e.g., a transistor), as is explained in various examples above, the conversion step may result in the generation of a switching frequency that is greater than the frequency of the three-phase AC input for modulating the transferred power. Under such circumstances, the modulating frequency may be filtered from the output of each converter.

At step 1306, the device combines the converted outputs into a single direct current output. As explained above, the conversion step 1304 may involve electrically isolating each of the rectified outputs from the converted outputs, which in turn enables combining of the converted outputs at step 1306 without having to perform complex load sharing. At step 1308, the device generates the control signal based on the combined single direct current output. In some examples, the voltage level of the single direct current output is the only parameter needed to perform this step. Further, the control signal may be the only signal used to control the conversion step 1304.

The above examples show rectification and conversion for three phase AC power, in which each stage of rectification/conversion takes three inputs and produces three outputs. In other examples, the number of inputs and/or outputs may increase, for instance if the inputted power consists of more than three components (e.g., six-phase AC power). This in turn may increase the number of diodes, transistors, capacitors, etc., needed in the rectification and conversion stages of such a device. In accordance with the present disclosure, such a device would still achieve the same or similar power factor correction, power regulation and electrical isolation, with the same or similar power efficiency, and would still be smaller, lighter, less expensive, and/or less complex than alternative devices, such as those similar to the devices of FIGS. 1 and 2.

In the above examples, only a single control circuit in a single control loop is used. However, it is possible to break up control of the various rectifiers/converters among multiple control circuits. Indeed, any amount of control circuits fewer that nine would likely achieve a savings in space, weight, complexity, and/or cost over the device of FIG. 1 without necessarily resulting in the complexity and/or technical risk imposed by the device of FIG. 2.

Furthermore, in each the above examples, the converter circuits are connected to one another in parallel and their combined output (voltage, current, or power) is sensed by the control circuit. Alternatively, it is possible to connect the converter circuits in series to one another. If the converter circuits are connected in series, it is further possible to sense the output of each converter circuit individually, in addition to or in place of sensing the combined output. In those examples where the output of each converter is sensed individually, an individual control signal for each converter may be provided.

Lastly, while the above examples describe power regulation using a control circuit that is set to a voltage-mode, it will be understood that the control circuit may alternatively be set to a current-mode (or a power-mode), in which the outputted current (or the outputted voltage multiplied by the outputted current) is used to adjust the control signal. For instance, with respect to a voltage-mode PWM control circuit 330 of FIGS. 3-8, the control circuit may provide feedback control by increasing or decreasing the pulse width of the generated control signal 350 based on any of a sensed output voltage, current, or combination of the two.

As these and other variations and combinations of the features discussed above can be utilized without departing from the subject matter as defined by the claims, the foregoing description of exemplary aspects should be taken by way of illustration rather than by way of limitation of the subject matter as defined by the claims. It will also be understood that the provision of the examples described herein (as well as clauses phrased as "such as," "e.g.," "including" and the like) should not be interpreted as limiting the claimed subject matter to the specific examples; rather, the examples are intended to illustrate only some of many possible aspects.

The invention claimed is:

1. A device for converting a three phase power input to a direct current output, the device comprising:
a rectification stage comprising a plurality of rectifier circuits arranged in parallel, the rectification stage rectifying the three phase power input into a plurality of rectified outputs, each of the rectified outputs having a common first mean voltage level;
a conversion stage comprising a plurality of converter circuits arranged in parallel, each converter circuit converting the rectified output of a respective rectifier circuit at the first mean voltage level to a converted output at a second mean voltage level based on a control signal, wherein each of the converter circuits receives the same control signal, wherein the control signal is the only feedback signal used by each converter circuit to convert the rectified output of the respective rectifier circuit, and wherein the converted outputs are combined to form the direct current output; and
a control circuit for receiving a voltage measurement of the direct current output of the device and generating the control signal based on the voltage measurement, wherein the voltage measurement is the only monitored control parameter on which the control signal is based.

2. A device according to claim 1, further comprising a load capacitor connected to each of the rectified outputs at the second mean voltage level and adapted to combine the rectified outputs at the second mean voltage level into the direct current output.

3. A device according to claim 1, wherein each of the rectified outputs at the first mean voltage level provides a continuously positive electrical current.

4. A device according to claim 1, wherein the control circuit comprises a pulse width modulator, and wherein the direct current output is controlled by the pulse width of the control signal.

5. A device according to claim 1, wherein the rectification stage comprises a first bridge rectifier circuit adapted to rectify first and second phase inputs of the three phase power input, a second bridge rectifier circuit adapted to rectify second and third phase inputs of the three phase power input, and a third bridge rectifier circuit adapted to rectify first and third phase inputs of the three phase power input.

6. A device according to claim 5, wherein the conversion stage includes a first isolation power conversion circuit adapted to electrically isolate an output of the first bridge rectifier circuit, a second isolation power conversion circuit adapted to electrically isolate an output of the second bridge rectifier circuit, and a third isolation power conversion circuit adapted to electrically isolate an output of the third bridge rectifier circuit, and wherein the direct current output is produced from the combination of isolated outputs.

7. A device according to claim 6, wherein each of the first, second and third isolation power conversion circuits is adapted to transfer an amount of electrical current from the output of the corresponding bridge rectifier circuit based on the control signal.

8. A device according to claim 1, wherein the direct current output is regulated by the control circuit without the control circuit performing load sharing techniques or receiving a current measurement.

9. A device according to claim 1, wherein the device has a direct current output of about 3 kilowatts or greater, and achieves near unity power factor.

10. A device according to claim 1, wherein the total current harmonic distortion to the three phase power input is less than about 4%.

11. A device according to claim 1, further comprising a housing, wherein each of the rectifier circuit, converter circuit and control circuit is disposed fully within the housing, and wherein the device weighs less than about 6.75 pounds.

12. A device according to claim 11, wherein the device weighs between about 3.5 pounds and about 6.75 pounds.

13. A device according to claim 11, wherein the device has a power density of greater than about 444 W/lb.

14. A system comprising:
a first device according to claim 1;
a three phase power source coupled to the first device; and
a second device coupled to the first device, wherein operation of the second device is powered by the direct current output of the first device.

15. One of an aircraft and a spacecraft, comprising the system of claim 14.

16. An aircraft or spacecraft according to claim 15, wherein the second device is a high pressure compression system.

17. A device according to claim 1, wherein the device achieves near-unity power factor without an active power factor correction circuit.

18. A device according to claim 1, wherein each of the converter circuits is a voltage-mode flyback circuit, and wherein a duty cycle and inductance of the converter circuit are constant under a steady state condition, and current across a primary inductor coil of the converter circuit is proportional to a voltage of the rectified output of the respective rectifier circuit.

19. A device for converting a three phase power input to a direct current output, the device comprising:
a control circuit adapted to sense the voltage of the direct current output and to generate a control signal using the sensed voltage, wherein the sensed voltage is the only feedback parameter of the device; and
a plurality of power conversion sub-circuits, each sub-circuit adapted to receive, at an input connection, a different portion of the three phase power input, each sub-circuit further adapted to receive the same control signal from the control circuit, and to convert the received portion of the three phase power input to a converted power output based solely on the control signal, wherein a respective output connection of each sub-circuit is coupled in parallel to one another such that the respective converted power outputs of each of the sub-circuits are combined into the direct current output.

20. A device according to claim 19, wherein each of the power conversion sub-circuits supplies an equal portion of power to the direct current output.

21. A device according to claim 19, wherein each of the power conversion sub-circuits includes a two-phase full-bridge rectifier circuit receiving two inputs of the three phase power input, the two inputs having a phase difference of about 120°.

22. A device according to claim 19, wherein each of the power conversion sub-circuits includes a transformer for transferring an amount of power from the input to the output, and a switching circuit for controlling operation of the transformer based on the control signal.

23. A device according to claim 22, and wherein the control signal controls a duty cycle of the switching circuit, and wherein the switching circuit is operative to control an amount of power transferred by the transformer based on the duty cycle.

24. A device according to claim 19, further comprising a filter circuit coupled to the plurality of power conversion sub-circuits, the filter circuit being operative to filter a switching frequency of the device.

25. A switch mode power converter comprising:
at least three power converter circuits, each power converter circuit comprising:
a voltage rectification circuit, each voltage rectification circuit adapted to receive a different portion of a three phase power input; and
a flyback transformer circuit coupled to the voltage rectification circuit and adapted to receive a first voltage from the voltage rectification circuit and convert the first voltage to a second voltage based on a switch duty ratio, wherein an electrical current across a primary coil of the flyback transformer circuit varies linearly relative to the first voltage of the voltage rectification circuit, wherein the outputs of each flyback transformer circuit are combined to form a direct current output; and
a control circuit providing the same feedback signal to each of the power converter circuits to control the switch duty ratio, wherein the feedback signal is generated by the control circuit based on a voltage measurement of the direct current output and no other feedback measurement, and wherein the feedback signal from the control circuit is the only feedback signal received by each power converter circuit.

26. A switch mode power converter according to claim 25, wherein the primary inductor coil is electrically coupled to the voltage rectification circuit and adapted to store an amount of electrical energy, and wherein each flyback transformer circuit further comprises:
a secondary inductor coil operatively coupled to the primary inductive coil and adapted to transfer the stored electrical energy, thereby generating an electrical current at the secondary inductor coil;
a flyback diode electrically coupled to the secondary conductor coil to control the transfer of the electrical current;
an output capacitor electrically coupled to the secondary conductor coil to filter the generated electrical current; and
a switch electrically coupled to the primary inductor coil and operative to control the amount of energy stored by the primary inductor based on the switch duty ratio.

27. A switch mode power converter according to claim 26, wherein the switch and primary inductor coil are operable in a steady state condition such that the switch duty ratio of the switch and inductance of the primary inductor coil are constant.

28. A three phase AC to DC power converter comprising:
means for rectifying a three phase alternating current power input,
means for regulating a direct current power output comprising:
means for generating a control signal based solely on the voltage of the direct current power output, and
means for converting the rectified three base alternating current power in input from a first power level to a second power level, wherein the control signal is the only feedback signal used by said means for converting to convert the rectified three phase alternating current power input; and
means for electrically isolating the alternating current power input from the direct current power output,
wherein the three phase AC to DC power converter achieves near-unity power factor in a single conversion stage.

29. A method of converting a three phase power input to a direct current output, the method comprising:
rectifying the three phase power input into a plurality of rectified outputs, each of the rectified outputs having a common first mean voltage level;
converting each of the plurality of rectified outputs from the first mean voltage level to a second mean voltage level based on the same feedback control signal;
combining the converted rectified outputs into the direct current output;
monitoring an output voltage of the direct current output, wherein the output voltage is the only monitored feedback parameter; and
generating the feedback control signal based on the output voltage, wherein converting the rectified outputs based on the feedback control signal forms the only feedback control loop used to convert the three phase power input.

30. A method according to claim 29, wherein rectifying the three phase power input into a plurality of rectified outputs comprises combining first and second phase inputs of the three phase power input into a first rectified voltage using a first rectifier sub-circuit, combining second and third phase inputs of the three phase power input into a second rectified voltage using a second rectifier sub-circuit, and combining first and third phase inputs of the three phase power input into a third rectified voltage using a third rectifier sub-circuit.

31. A method according to claim 29, wherein converting each of the plurality of rectified outputs comprises, for each rectified output, electrically isolating the rectified output using a respective isolation power conversion circuits.

32. A method according to claim 29, wherein converting each rectified output from the first mean power level to a second mean power level based on a feedback control signal comprises controlling the second mean power level based on a pulse width of the feedback control signal.

33. A method according to claim 29, further comprising:
generating a switching frequency which is greater than the frequency of the three phase input; and
modulating the rectified output using the switching frequency.

34. A method according to claim 33, further comprising filtering harmonics of the switching frequency.

* * * * *